Sept. 2, 1969      A. F. STAMM      3,464,616

FRICTION WELDING MACHINE AND METHOD

Filed Dec. 23, 1963      11 Sheets-Sheet 1

INVENTOR
ALEX F. STAMM

BY
*Strauch, Nolan & Neale*
ATTORNEYS

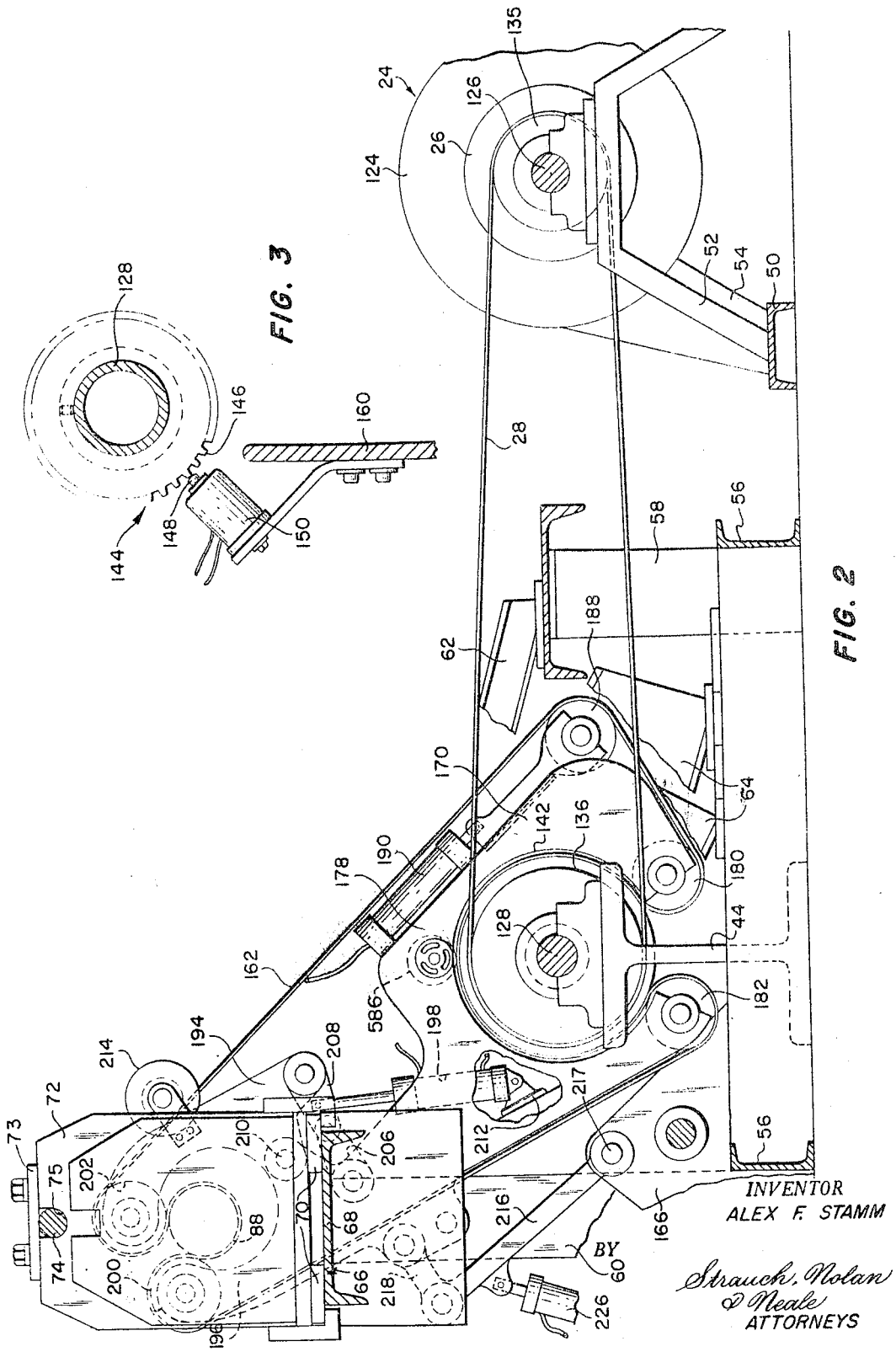

Sept. 2, 1969  A. F. STAMM  3,464,616
FRICTION WELDING MACHINE AND METHOD
Filed Dec. 23, 1963  11 Sheets-Sheet 3

INVENTOR
ALEX F. STAMM
BY
*Strauch, Nolan & Neale*
ATTORNEYS

Sept. 2, 1969  A. F. STAMM  3,464,616
FRICTION WELDING MACHINE AND METHOD

Filed Dec. 23, 1963  11 Sheets-Sheet 4

INVENTOR
ALEX F. STAMM
BY
Strauch, Nolan & Neale
ATTORNEYS

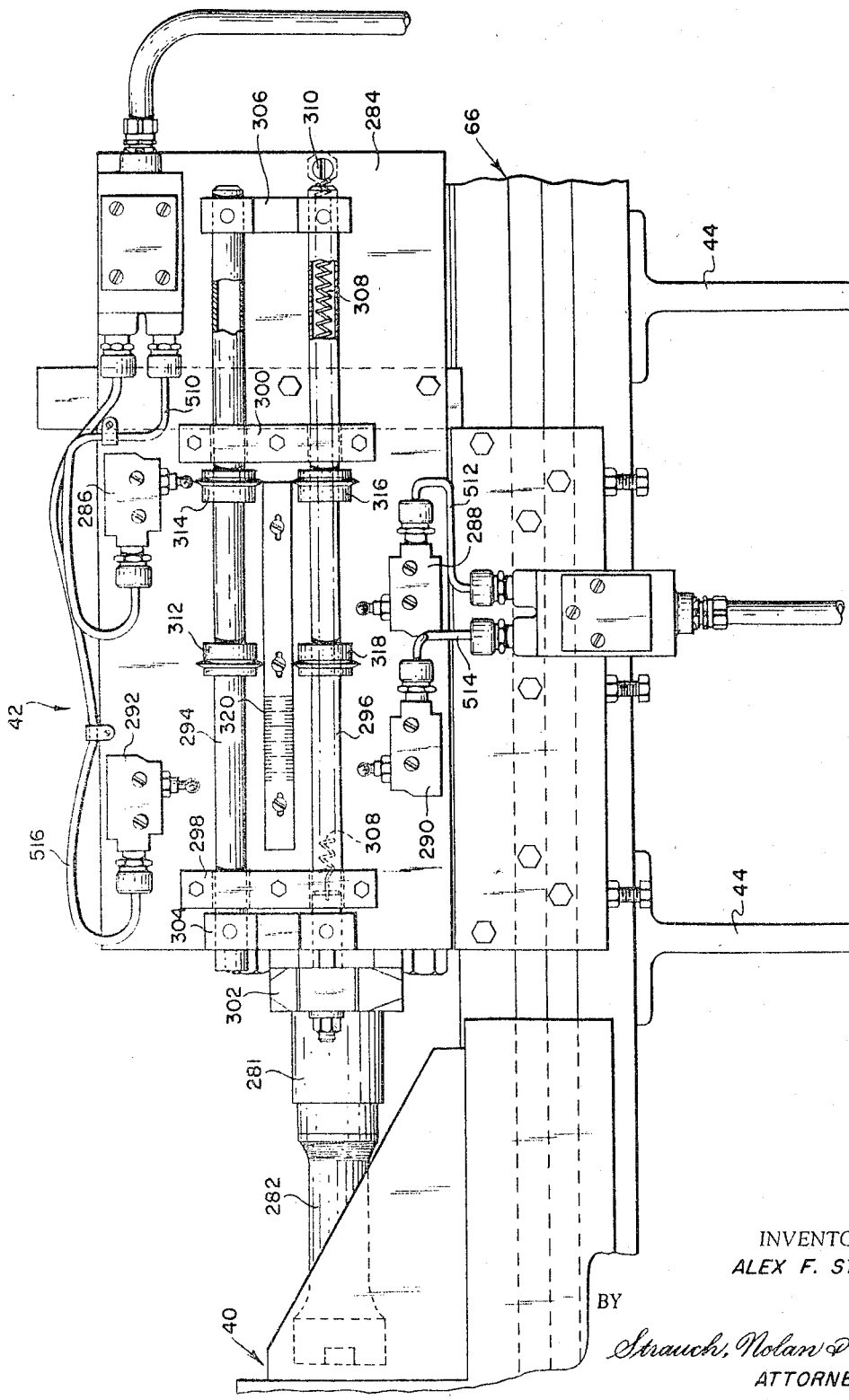

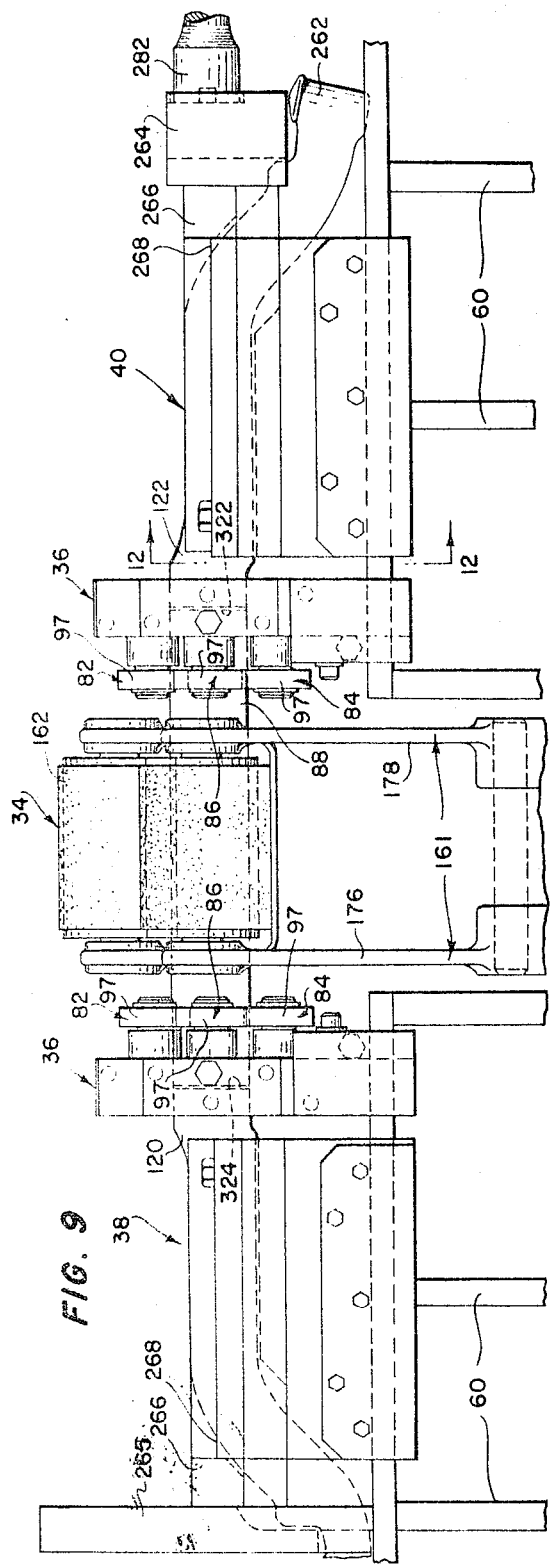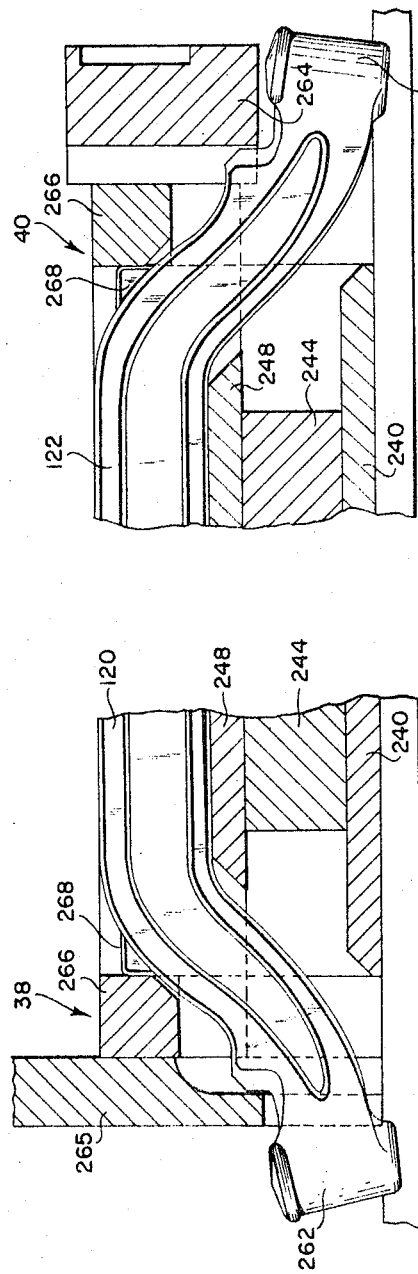

Sept. 2, 1969  A. F. STAMM  3,464,616
FRICTION WELDING MACHINE AND METHOD
Filed Dec. 23, 1963  11 Sheets-Sheet 7
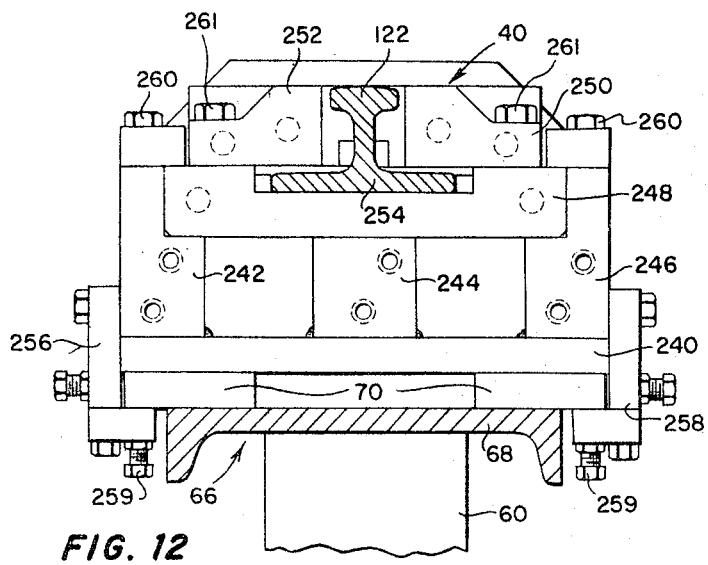
FIG. 12
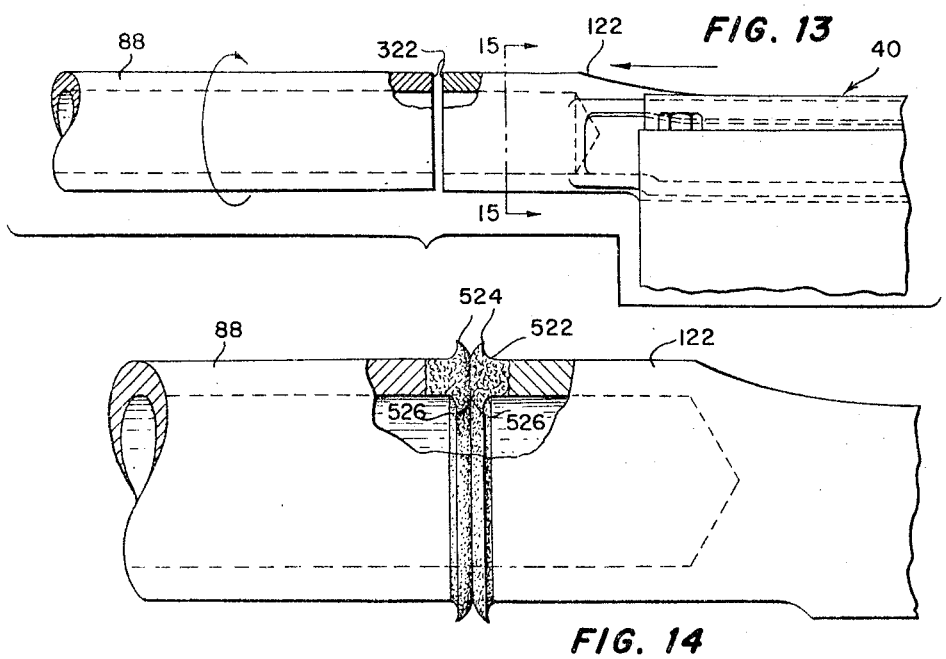
FIG. 13
FIG. 14
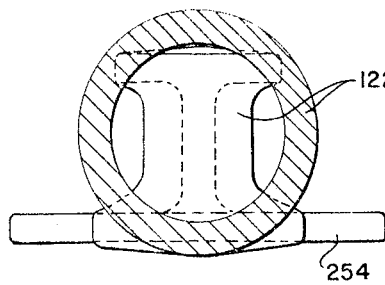
FIG. 15
INVENTOR
ALEX F. STAMM
BY
Strauch, Nolan & Neale
ATTORNEYS

INVENTOR.
ALEX F. STAMM

BY Strauch, Nolan & Neale
ATTORNEYS

United States Patent Office 3,464,616
Patented Sept. 2, 1969

3,464,616
FRICTION WELDING MACHINE AND METHOD
Alex F. Stamm, Rochester, Mich., assignor to Rockwell-Standard Company, a corporation of Delaware
Filed Dec. 23, 1963, Ser. No. 332,365
Int. Cl. B23k 27/00
U.S. Cl. 228—2    8 Claims The present invention relates to friction welding machines and methods and more specifically to a rotary friction welder having a work belt drive.

In the welding process known as friction welding, metal bodies to be welded together are pressed and rubbed against each other at the surfaces to be joined, thereby generating heat, which by proper determination of the pressure and sliding speed causes the metal at the abutting joint surfaces to become plastic and fusible thereby integrally bonding the metal bodies together after relative motion is stopped and the metal solidifies. Upon the metal reaching the proper plastic stage, rubbing movement between the bodies is interrupted and the pressure may be increased substantially to fuse the two bodies together. After proper cooling, a rigid permanent bond is established between the metal bodies which in certain instances has proved superior to the base metal itself.

This process can be accomplished in two ways, first, by relatively linearly sliding the members to be welded against each other, and second by relatively rotating the members against each other. The present invention is concerned with the latter method, that is, friction welding by rotation. To this end, only one member may be rotated and the other held stationary, or both members may be rotated but at different speeds and/or in opposite directions, or, as required in certain applications, three members may be welded together by holding the two outer members stationary and rotating the central member between them. In certain instances, it may be desired or necessary to use welding material between the surfaces to be bonded or to coat those surfaces with a metal or metal alloy other than the base metal to assure an adequate bond or to generate frictional heat more rapidly and thereby reduce the welding time.

It may also be desired to pre-heat the welding areas immediately adjacent the weld surfaces to reduce the time required to generate the proper amount of friction heat. This can be done by localized induction heating in such a way that the remaining portions of the members to be friction welded will not be affected by the heating.

However, in general, the members to be friction welded may be joined together without any prior preparation of the welding surfaces provided only that the welding surfaces to be joined are reasonably smooth, free from pits or foreign particles clinging thereto and lie in approximately parallel planes. Almost any known metals may be welded together in this manner, the more common of which are: carbon steel, alloy steel, aluminum, titanium, copper, brass, bronze and other alloys. Likewise, compatible dissimilar metals may be joined together, which however frequently requires pre-heating of at least one of the members. An intermediate welding material may be first bonded to one member to assure proper fusion of the different metals at the weld joint.

Due to the nature of this welding process by which at least one of the members must be rotated it is generally imperative that one member not only be symmetrical about the axis of rotation, at least at the weld joint, but also preferably be of circular cross-section. This tends to limit the friction welding process to such applications as the welding of pins, rods or tubes to each other or to plates or asymmetrical bodies having a planar surface to which the rod or tubes are to be welded.

Although the varied and important advantages gained by the friction welding process which include lower power requirements and the fact that the heat generated at the welding surfaces is strictly localized, that is heat is induced only in those areas of the workpieces where it is needed for welding and the structure of the metal of the remaining part of the workpieces is not affected by the heat, it has only recently attracted active commercial interest and has gained limited acceptance in the metal manufacturing industry. One reason for this is that it proved difficult to design the special machinery needed to mass produce friction welded articles of any but the simplest configuration on a production basis. Machines capable of friction welding a variety of workpieces of different sizes and shapes needing only a nominal amount of set-up changeover are required. Although the friction welding process per se has been known for at least forty years, it has been commercially practiced up to the present only as to small pieces of equipment such as welded tool tips, reconditioning of tools and small pipe sections, the welding operation being performed on make-shift equipment or converted lathes.

There is a growing need for friction welding larger and more complicated pieces of equipment but the difficulties of providing a machine sufficiently effective for accomplishing this purpose are considerable. The workpieces must be exactly axially aligned and kept so aligned during the welding process to produce a finished product of acceptable commercial quality, and it is extremely difficult to rotate a large, long and heavy workpiece and at the same time apply axial pressure without danger of misalignment or buckling of the workpiece. This is even more pronounced where a center section is to be welded to two end sections which may be irregular in shape. In this instance the center section is rotated whereas the end sections are held stationary and means is required to positively rotate the center section while keeping it adequately aligned with the end sections during welding. Prior to the present invention such could not be achieved with known friction welding machines. By the present invention relatively large and heavy center sections may be welded to likewise relatively heavy end sections. For example, tubular mid-sections of trailer axles may be welded onto both flanged end spindles at the same time, or round center sections of front axles may be welded onto both outer king pin mounting sections simultaneously.

In principle, machine tools such as lathes and drilling machines can be converted for use as friction welders, but these conventional metal-working machines are entirely unsatisfactory for prolonged or permanent heavy duty use as friction welding machines. These machines cannot provide the required high axial pressures and relatively high rotational speeds. Also considerable vibrations are set-up during the initial contact stage of the welding process in such machines which are lacking in mass, accuracy and rigidity. These factors combined would cause an early break-down of conventional metal working machines. Another fact to be considered is that the conventional metal-working machines are usually not equipped with special brake and clutch mechanism or the like to stop work rotation sufficiently fast at the proper time as required in the friction welding process.

Thus, the development of special machines of different character is essential in order to effectively use the friction welding process. Industrial use may require three different groups of machines such as: general purpose machines for mass production of small to medium size articles of any particular group of articles of similar design; special purpose machines for larger pieces and for pieces of asymmetrical cross-section; and a third group for welding center sections simultaneously to two end sections. The present invention is concerned mainly with the latter two groups of machines which may be combined into one since the center section friction welding machines may also be adpated to weld only one part to another with certain structural modifications such as the addition of a suitable thrust bearing.

In building friction welding equipment according to the invention some basic requirements applicable to all three groups of machines were observed to provide an acceptable machine. First, there must be means to effectively control the speed of rotation and axial pressure and a predetermined operational cycle. Also the welding time and the amount of axial presure must be accurately controlled, and there must be control means for stopping rotation of the workpiece quickly at a predetermined time. The means to control these functions of the friction welding machine are preferably electric, and although individual controls may be made to be operated manually, it is preferably that all controls be interconnected so that the entire operation will be completely automatic and sequential during a welding cycle.

The structural design of the machine must consider such basic requirements as: loaded assemblies in the machine must be rigidly mounted to prevent radial displacement of the axes of the workpieces during the welding process, and all machine assemblies must have the required strength to be able to withstand relatively high load stresses and absorb the vibrations caused by the initial "rubbing-in" stage of the welding cycle. The clamps or chucks to hold the non-rotating workpiece or workpieces must be constructed to prevent the workpieces from rotation due to the frictional moment exerted by the rotating workpiece. In welding relatively long articles such as shafts, rods, length of tubes, etc., additional clamps must be provided along their lengths to prevent them from buckling under axial pressure. A brake and disconnect clutch must be provided to interrupt the drive and stop rotation of the workpiece. Pressure means must be provided to exert axial force during the welding cycle which may be either mechanically actuated or by air or hydraulic means, the hydraulic means being preferred since hydraulic pressure can be easily controlled and is capable of exerting high force. Control of the axial pressure means, rotation of the workpiece and clutch and brake actuation are, in the instance of the present invention, preferably interconnected with the electric controls mentioned above; the sequence of actuation being controlled by a series of suitable switches and/or timers. Thus, the complete operation of the machine can be made wholly automatic and the entire cycle of the welding process may be programmed.

In friction welding, if only one piece is welded to another, it is not difficult to rotate one of the pieces since it can be clamped in a chuck on the welding machine. However, when a center section is to be welded to two end sections simultaneously, a more difficult situation arises. In such cases, the two end sections of the article to be welded are clamped in supports in the machine spaced apart from each other and held stationary against rotation, however one of the end section supports must be axially slidable to enable axial pressure to be applied during the welding cycle. The center section which is to be rotated must then be placed between the end sections and supported in proper alignment therewith and some external means must be provided to rotate the center section without displacing it from its aligned position. This has not been effectively accomplished until the present invention, and it makes possible for the first time the friction welding of such large articles of irregular cross-section such as vehicle axles, tubular or solid.

An important requisite in rotational friction welding is that the workpiece diameter at and immediately adjacent the welding surface of at least one of the surfaces to be joined shall be constant for a length sufficient to provide for proper heating and weld upset and shall preferably be circular. The remaining part of the workpiece, which is not rotated (in this instance the two end sections of the article, for example, a vehicle axle), may be of any conventional cross-section as required in vehicle axle structures where the axle ends are usually provided with wheel spindles, flanges, etc. or, as in front axles, with yokes or steering knuckle bosses, and the cross-section may be of any shape other than round, for example, of I-beam or other section. These end sections, because they are held stationary, may also be non-coaxial, that is, portions may be bent away from the center axis. The midsection, which is to be rotated, however, must be symmetrical around its longitudinal axis and preferably around to assure smooth rotation and eliminate any centrifugal force bulid-up. The weld ends of the center section shall preferably be of the same diameter as the weld ends of the end sections for at least a distance sufficient to provide sufficient material to form the weld. The remaining portion between the ends of the center section may be of larger diameter if desired. Even with a circular cross-section further difficulties had been encountered to rotate the center section effectively by external means and to the best of our knowledge no such effective and direct rotation means had been devised prior to the present invention.

With the novel structure provided by the present invention it is possible to economically friction-weld by rotation larger metal articles than hitherto possible and to friction-weld center sections simultaneously to opposite end sections by rotating the center section in between the end sections under axial pressure exerted at the end sections.

Accordingly, it is a major object of the present invention to provide a novel apparatus and method for friction-welding together relatively large metal articles by rotating one piece against another, or by rotating a center section between two end sections being held stationary and applying axial pressure to the metal articles to be welded during the welding cycle.

Another object is the provision of a rotary friction welding machine embodying novel means to effectively rotate a metal body constituting a center-section for an article between two end sections of the article which are held relatively stationary in the machine to friction-weld the two end sections and the center section of the article together.

A further object is to provide in a friction welding machine of the rotary type means to non-rotatably hold end sections of an article to be welded in fixtures one of which may be axially slidable in a direction towards the other end section and further to provide means to support, align and rotate a center section of the article to be welded between and in high pressure axial abutment with the end sections.

Still another object is to provide in a novel friction welding machine fully automatic programmed electrical controls to automatically perform a complete pre-selected welding cycle, including in sequence clamping of the workpiece to be rotated, start rotation of the workpiece, applying axial pressure and maintaining it during welding, stopping rotation of the workpiece, further increasing axial pressure for a short time, reducing the axial pressure and releasing the welded article.

A still further object of the present invention is the provision of a novel method and apparatus for friction welding relatively large articles together which involves accurately aligning, clamping and rotating a center section of the article between two non-rotating end sections by special means directly in association with the center section to be rotated.

Another object is to provide in a friction-welding machine a novel work belt drive arrangement to rotate a workpiece axially pressed against another to weld them together frictionally without slippage occurring in the drive.

A further object of the present invention resides in the provision of a novel wholly automatic, rotary friction welding machine to produce relatively large welded articles such as vehicle axles, crossbeams, or the like.

Another object of the present invention is to overcome the foregoing disadvantages of the prior art by providing novel apparatus and method capable of friction-welding relatively large mass metal articles by rotating one piece against another similar or dissimilar stationary piece or by rotating a center piece between two similar or dissimilar non-rotatable end pieces while maintaining accurate axial alignment of the surfaces to be joined, applying heavy axial pressure to the metal articles to be welded during the welding cycle and permitting relative axial displacement of said pieces during welding.

Another object is the provision of a rotary friction welding machine embodying novel apparatus to effectively rotate a metal body without product influencing lateral displacement thereof constituting a center section for an article between two stationary end sections to establish simultaneous integral union of the two end sections and the center section of the article together.

An additional object of the present invention is the provision of a versatile, rugged rotary friction welding machine embodying novel belt drive apparatus to rotate large, heavy and/or complex metal objects against another similar or dissimilar stationary piece or intermediate two similar or dissimilar relatively stationary end pieces such that product-affecting radical vibration is substantially eliminated irrespective of the magnitude of applied axial pressure and the speed of rotation during the welding cycle while some relative longitudinal shift is permitted to compensate for metal displacement.

A further object is to provide in a friction-welding machine of the rotary type a plurality of novel fixture members to hold end sections to be welded, one of which may be laterally and rotatably immovable but axially slidable in a direction toward the other end section, and further to provide associated structure to axially slidably support, axially align and positively rotate a center section of the article to be welded intermediate the end sections, together with arrangements for selectively controlling the axial pressure.

A further object is the provision of a low power demand rotary friction welding machine requiring only nominal maintenance and capable of achieving a high quality single or multiple weld of high strength wherein the axial force and speed of rotation requirements may be correlatively varied to achieve the result desired on any predetermined cycle.

Still another object is to provide a novel adjustable, versatile friction welding machine capable of being fully automated and programmed including electric, electronic and fluid controls to automatically perform a complete welding cycle via actuation of a clamping device to quickly and easily load and unload and align the workpiece to be rotated, application of axial pressure of constant or varying magnitude throughout the welding cycle, and starting and rapidly stopping rotation of the workpiece, whereby mass production of a variety of large two or three piece friction welded articles is achievable, only a nominal amount of changeover for different workpieces if required, only minimal or no straightening is necessary and close tolerance control of the overall length is attainable.

A still further object of the present invention is the provision of a novel method of friction welding relatively large articles which involve the steps of aligning, clamping and rotating one section of the article to be formed against a second stationary section or between two non-rotating end sections under varying axial force while maintaining alignment whereby one or more high quality, short time requirement friction weld joints may be produced simultaneously.

A further object of the present invention resides in the provision of a novel method and apparatus for friction welding two end sections of a vehicle axle to a center section.

Other objects and novel features will become evident by the following detailed description in connection with the appended claims and ths accompanying drawings in which:

FIGURE 2 is a side elevation of the machine along line 2—2 of FIGURE 1 with parts broken away and sectioned for clarity and to illustrate the novel arrangement of parts including the belt drive mechanism;

FIGURE 3 is an enlarged fragmentary cross-section through the main drive shaft assembly along line 3—3 of FIGURE 1 showing the speed sensor device;

Figure 1:
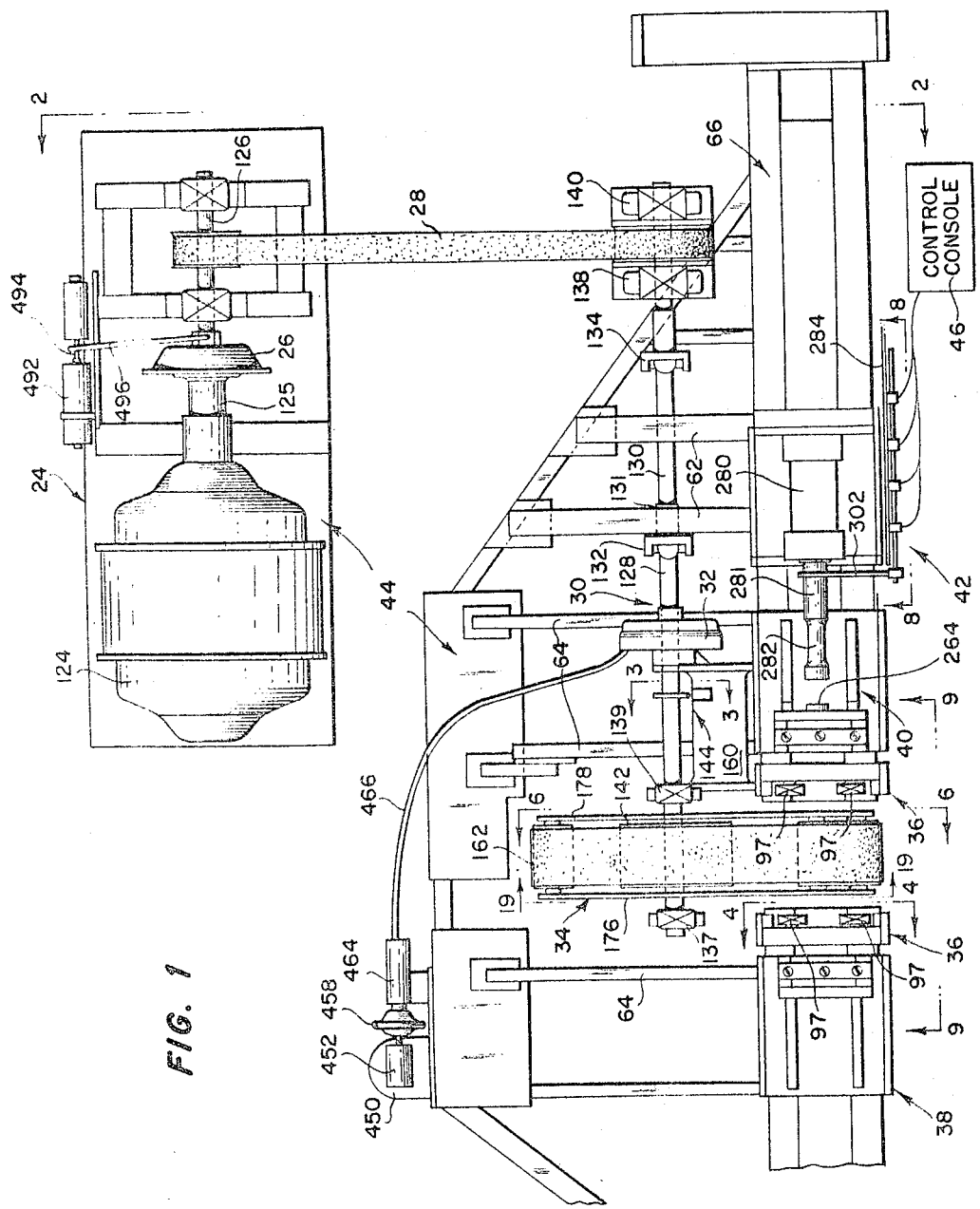
FIGURE 1 is an overall schematic plan view of a preferred embodiment of the rotary friction welding machine of the invention.
Figures 6, 7:
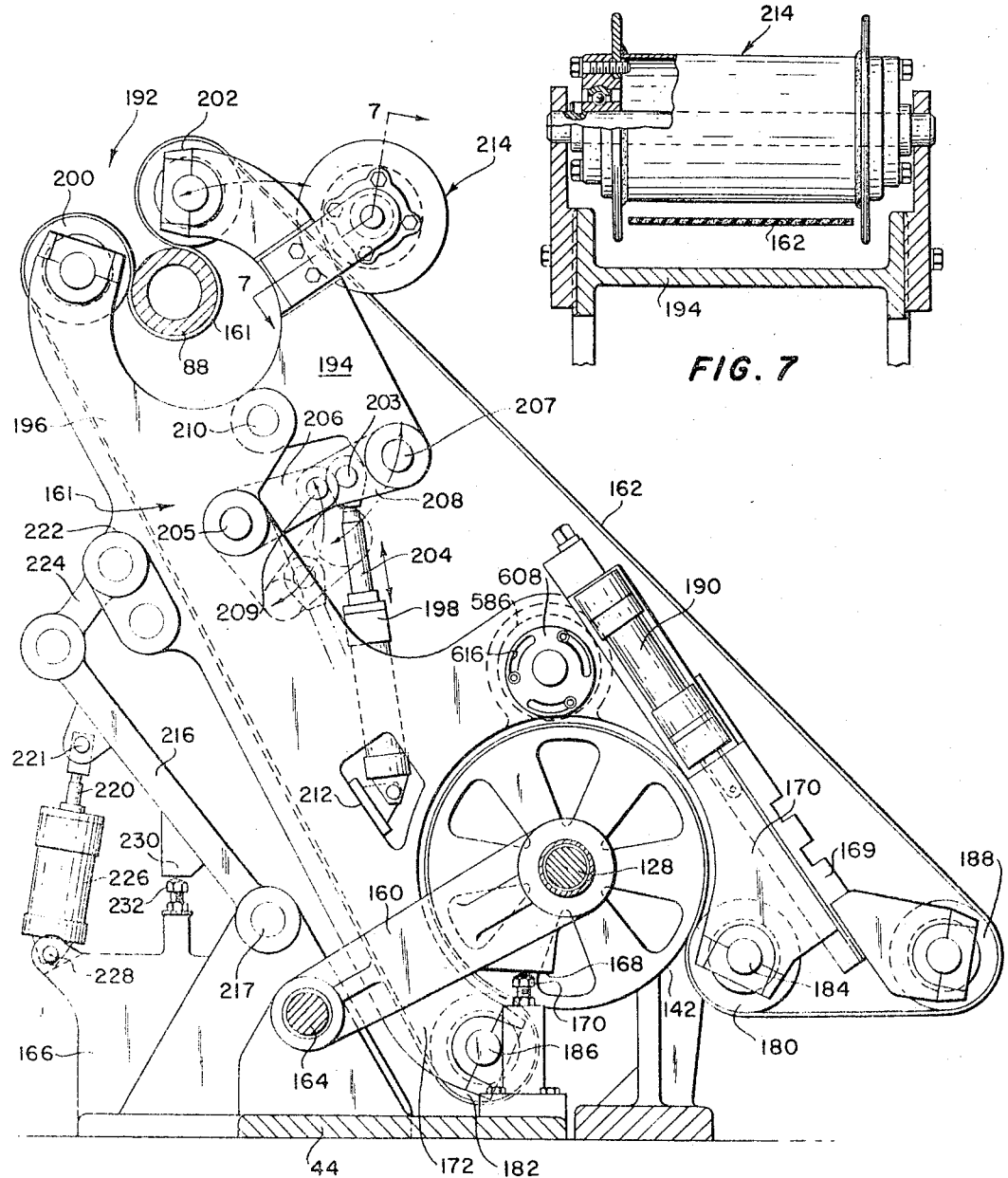
FIGURE 6 is an end elevation in cross-section along line 6—6 of FIGURE 1 showing the work belt drive mechanism for rotating one workpiece against one or more additional workpieces including an aligning piston, a jaw actuating piston to load and unload the workpiece and a belt tightening piston.
FIGURE 7 is an enlarged partial cross-section along line 7—7 of FIGURE 6 through the belt vibration preventing idler pulley.
Figure 16:
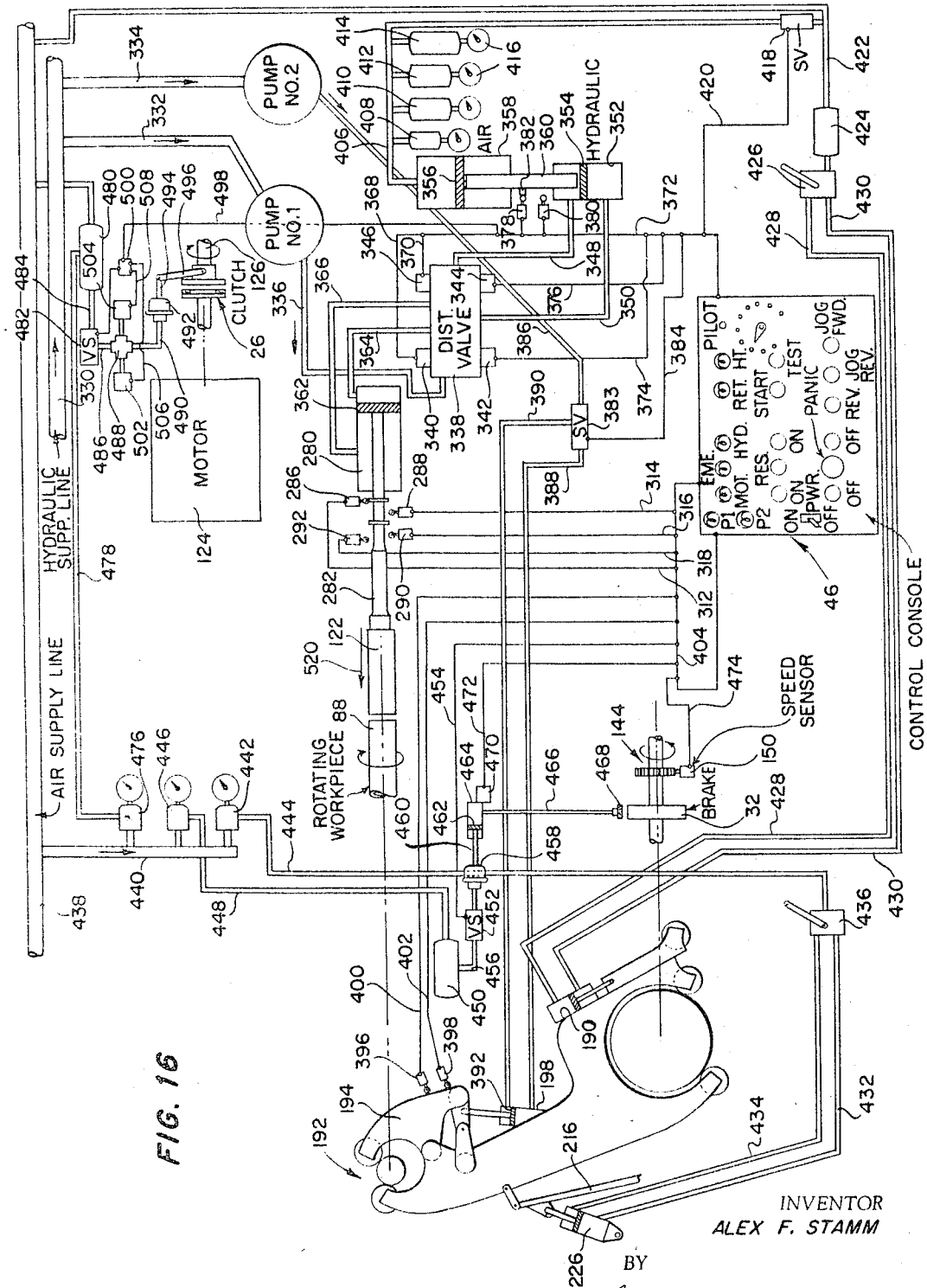
Figure 17:
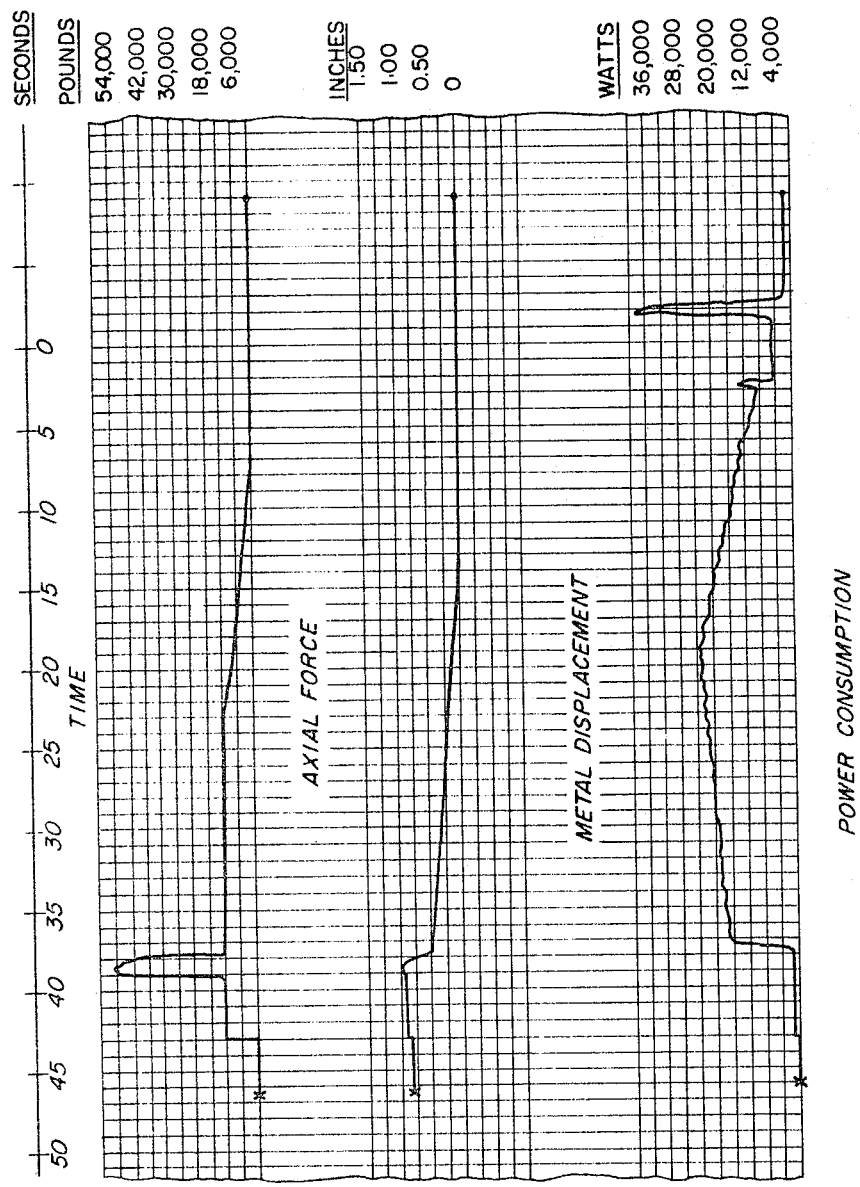
Figure 18:
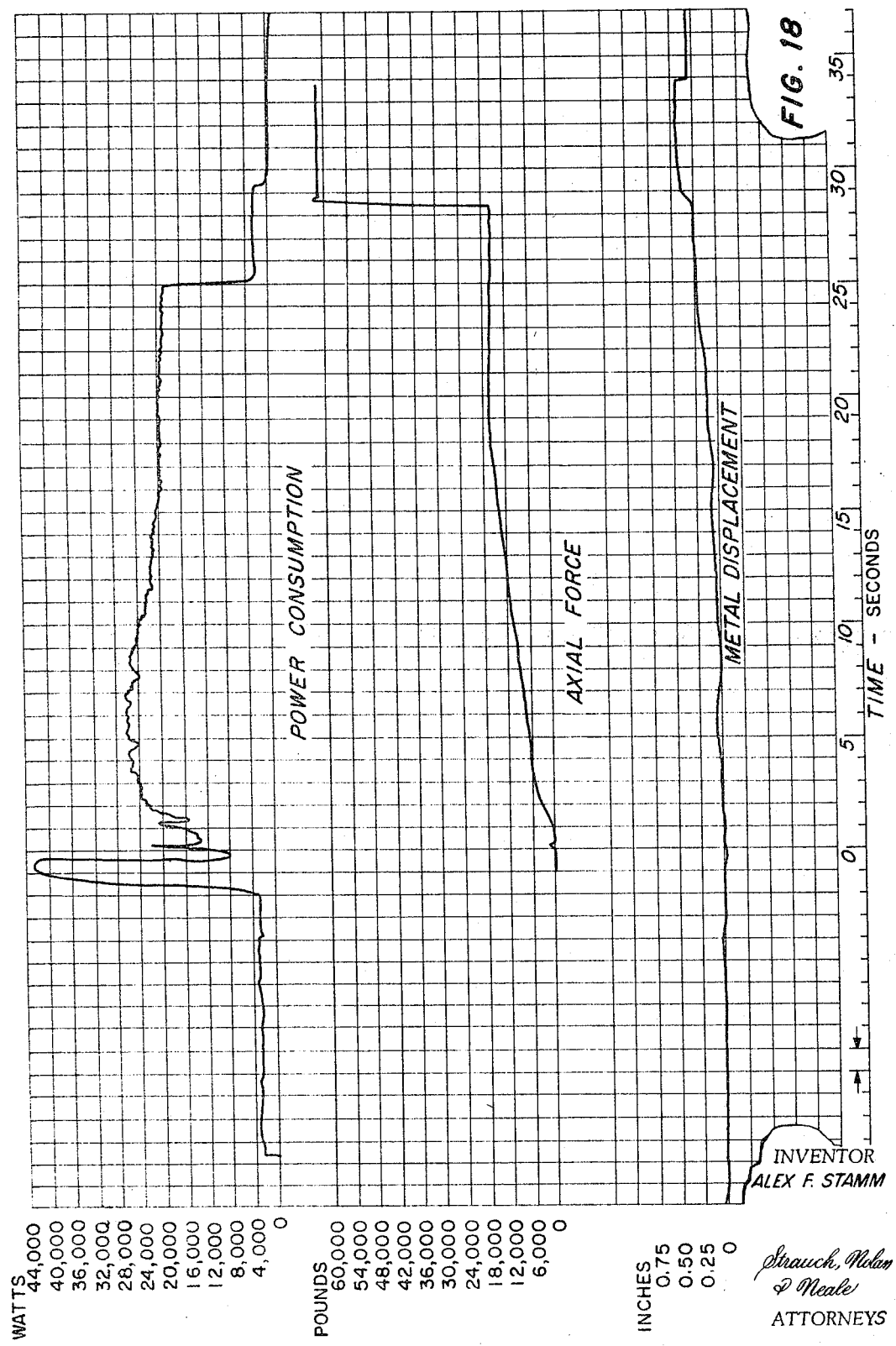
Figure 19:
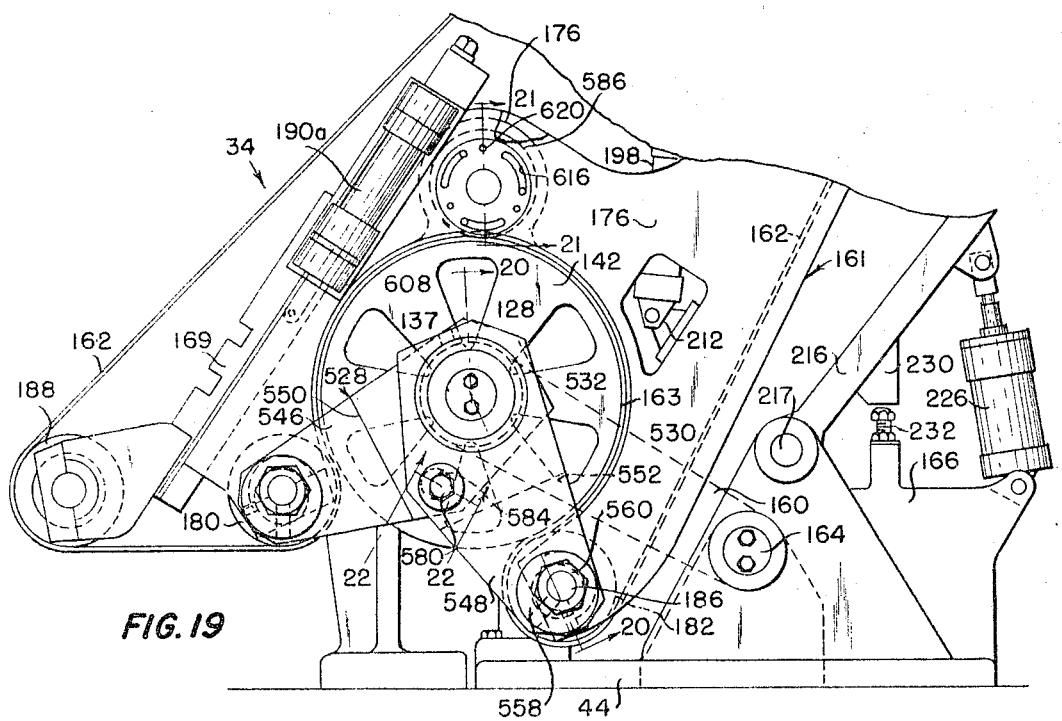
Figure 21:
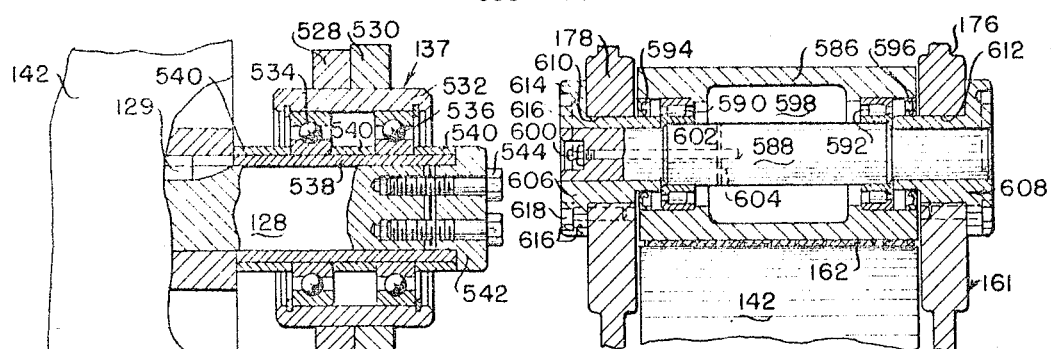
Figure 20:
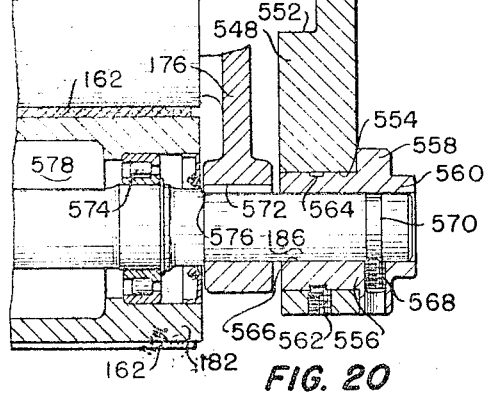
Figure 22:
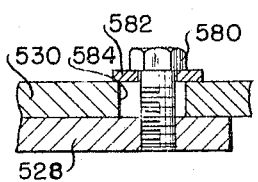

FIGURE 8 is an enlarged side elevation taken along line 8—8 of FIGURE 1 showing the four limit stop switches at the front of the machine which, when energized, effect in series the starting of the weld cycle and preparatory axial "push-up"; the initial "rubbing-in" and subsequent friction heating step; the end of the heating step; the release of the clutch and the application of the brake to stop rotation of the workpiece; and the final axial post rotation axial "push-up" and hold during cooling followed by release of the axial, post-rotation "push-up" force;

FIGURE 9 is an enlarged fragmentary view showing the friction welding work area with the three workpieces of a vehicle front axle including a symmetrical center piece and two dissimilar asymmetrical end pieces clamped in the machine preparatory to welding;

FIGURES 10 and 11 are enlarged fragmentary cross-setcions through the stationary axle end piece clamping and supporting devices of FIGURE 9;

FIGURE 12 is a cross section along line 12—12 of FIGURE 9 illustrating in detail one type of non-rotatable, slidable clamping and supporting device surrounding and securing an end piece of the axle having a spring mounting plate;

FIGURE 13 is an enlarged fragmentary elevation view partly broken away and sectioned illustrating a relatively large rotatable tubular workpiece adjacent a relatively large complex asymmetrical stationary end piece prior to initiating of the welding cycle;

FIGURE 14 is an enlarged elevation view partly broken away and sectioned showing the finished weld of the two pieces of FIGURE 13 following completion of the welding cycle;

FIGURE 15 is a cross-section through the end workpiece of FIGURE 13 taken along line 15—15 of FIGURE 13;

FIGURE 16 is a schematic layout of one manifestation of the fluid and electrical control systems of the friction welding machine of the present invention;

FIGURE 17 is a graphic illustration of the power consumption, the axial pressure requirements and the displacement of metal for one particular set of workpieces during the welding cycle;

FIGURE 18 is another graphic record similar to FIGURE 17 showing another method by which the heating cycle may be considerably shortened;

FIGURE 19 is a fragmentary side view of the lower section of the work belt drive mechanism as viewed in opposite direction from FIGURE 6 and substantially along line 19—19 of FIGURE 1;

FIGURE 20 is a cross-section along line 20—20 of FIGURE 19;

FIGURE 21 is a cross-section through the upper adjustable pulley along line 21–21 of FIGURE 19; and FIGURE 22 is a cross-section along line 22—22 of FIGURE 19.

Introduction

The friction welding machine of the present invention, illustrated as a unit in FIGURE 1, essentially comprises an electro-mechanical drive unit 24 including a clutch 26 and a belt 28, an input shaft drive mechanism 30 including a fast acting brake 32, a workpiece belt drive unit 34 capable of rotating one object to be welded against a second or between two other rotatably stationary objects to be welded without misalignment, workpiece aligment and bearing support assemblies 36, a fixed end workpiece clamping unit 38, a non-rotatable but axially slidable end workpiece clamping unit 40 and a force applying assembly 42 to press the several objects to be welded into frictional surface engagement. All of the foregoing components are supported on a frame 44 and each being automated and programmable through control console 46.

In the three piece operation one end workpiece is stationarily locked in position in clamping unit 38, a second ed workpiece is locked in position in clamping unit 40, while a center workpiece is stationed in series intermediate the end workpiece and axially locked in position by belt drive unit 34 and workpiece alignment and bearing supports 36.

The sequential operational steps are programmed into control console 46 whereby electro-mechanical drive unit 24 is started and clutch 26 is automatically engaged to drive belt 28 to rotate input shaft drive mechanism 30 and workpiece belt drive 34 to turn the center workpiece. Force applying assembly 42 is actuated to bear against workpiece clamping unit 40, sliding it to the left as viewed in FIGURE 1, thereby forcing the two pairs of surfaces to be welded of the three workpieces into heat generating frictional engagement. Sufficient heat is thus generated to plasticize the metal at the weld locations, whereupon clutch 26 automatically disengages drive unit 24 simultaneous with the automatic engagement of brake 32 to immediately stop belt drive 34 to arrest rotation of the center workpiece. At this point, the force being applied by force applying assembly 42 is preferably increased for a short time, interval to displace the welding metal and aid in fusion of the pieces together into one integral structure.

Total welding time required even for relatively large objects is usually less than 60 seconds and the power requirement, due largely to localization of the heat of welding, is materially less than that required for standard electric arc welding for the same workpieces. The metal grain structure at the welded joints is substantially the same as the metal grain structure of the parent metal or metals and often has a fatigue strength greater than that of the non-joint structure.

The lateral dimensions of the workpieces at and immediately adjacent the welding surfaces is preferably constant to provide a sufficient length to establish proper heating and weld set-up. Circular cross sectional surfaces in frictional engagement are preferred. The end workpieces, which are not rotated, may be of any cross-section, regular or irregular, such as for example wheel spindles and flanges required in vehicle trailer axles and vehicle drive axle housings or yokes and steering knuckle bosses required in vehicle non-driving front steering axles. The end workpiece cross section is preferably circular but may also be otherwise, such as I-beam. The center workpiece must be substantially symmetrical along its longitudinal axis and preferably circular in cross section along the length to permit ease of rotation and prevent centrifugal force build-up. However, adaptors may be used in conjunction with non-circular center pieces to achieve desirable welds.

Control console 46 controls the operational method steps of the friction welding machine of FIGURE 1 through a network of electric controls and fluid controls, including both air and hydraulic controls, as diagrammatically illustrated in FIGURE 16 and explained hereinafter.

The frame or substructure

The frame or substructure 44 may comprise a rigid unit of interconnected structural steel shapes held stationary as by bolting to a factory floor. Frame 44, best shown in FIGURE 2, includes at one position base 50 and support members 52 and 54 which support drive unit 24 and clutch 26. At a second position (FIGURES 1 and 2) input shaft drive mechanism 30, brake 32, belt drive 34, alignment and bearing supports 36, clamping units 38 and 40, and force applying unit 42 are all supported upon base 56 by columns, such as 58, and 60, and lateral cross members such as 62 and 64.

Rigidly mounted at the upper end of columns 60 is track 66 comprising channel 68 and mounting plates 70. At opposite ends of track 66 are plate column supports 72 stabilized by a rod 74 running therebetween and fastened by bolted clamps 73 in recess 75. Track 66 facilitates mounting and positioning of alignment and bearing support assemblies 36, work clamping units 38 and 40, and force applying unit 42 prior to the welding operation and also permits axial "push-up" of slidable clamping unit 40 during the welding operation.

Alignment and bearing support members

Figure 4:
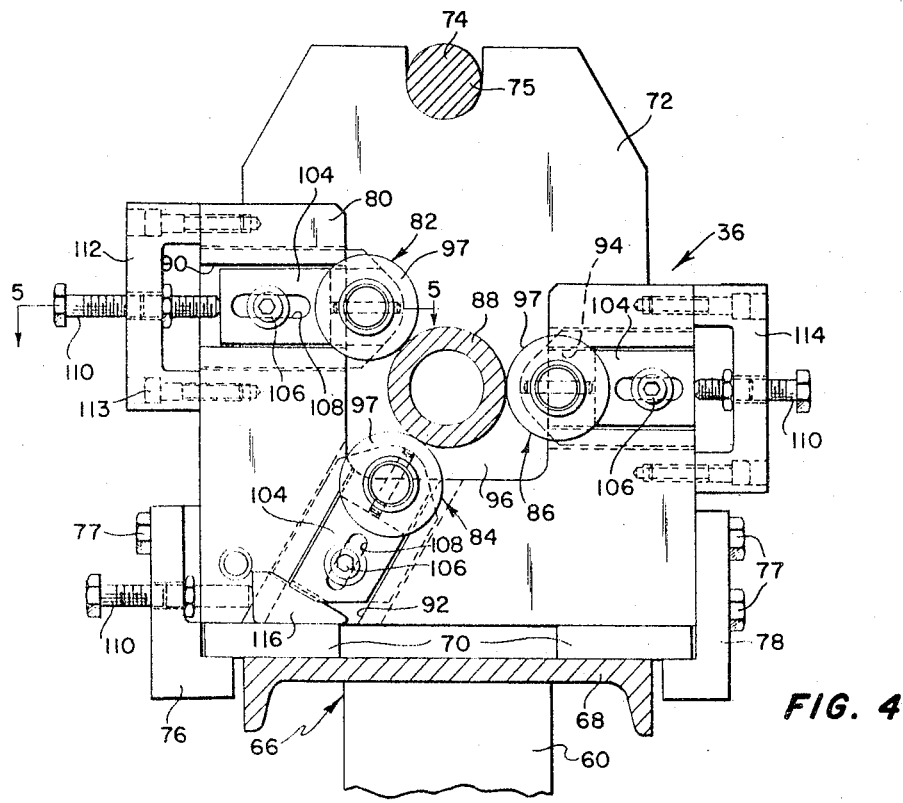
FIGURE 4 is an enlarged fragmentary cross-section along line 4—4 of FIGURE 1 showing in detail one of the adjustable roller supports for a workpiece.
Figure 5:
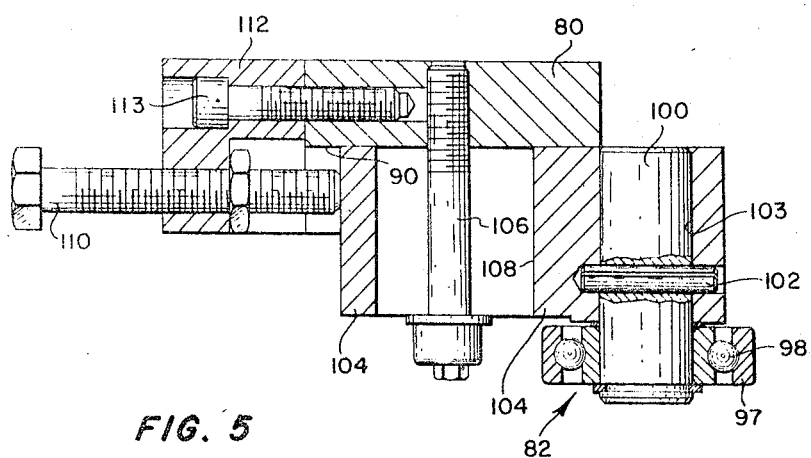
FIGURE 5 is a cross section along line 5—5 of FIGURE 4 showing in detail certain adjustment and fastening features.

The pair of alignment and bearing support assemblies 36 are, except for being opposite hand, preferably identical and are best illustrated in FIGURES 4 and 5. Each assembly 36 comprises a base 80 carried on track member 66 and fixed in position against mounting plates 70 by L-shaped brackets 76 and 78 secured by cap screws 77. Each assembly 36 includes adjustable workpiece supports 82, 84 and 86 to appropriately position a workpiece 88. Base 80 is generally U-shaped, having an opening 96 through which workpiece 88 extends and rotates without obstruction. Supports 82, 84 and 86 are preferably equiangularly spaced in a common plane about workpiece 88.

Each support 82, 84 and 86 comprises a body 104 that is slidable in a guide recess 90 on base 80 and carries a workpiece engaging roller 97 which may be the outer race of an anti-friction bearing 98 having its inner race fixed on a stationary shaft 100 that fits into a bore 103 in body 104 and is secured there as by pin 102. Each support roller 97 is adjustably positioned radially with respect to workpiece 88 by loosening a clamping bolt 106 that is mounted on base 80 and extends through and adjusting a lockset screw 110 mounted in clamps 112 and 114 and bracket 76 as shown are secured to base 80 by bolts 113.

A wedge 116 is interposed between the end of adjustment screw 110 and the associated body 104 for convenience of access and smooth adjustment. The foregoing adjustable mounting of the workpiece supports provides for handling a variety of differently sized workpieces. The structure is such that workpieces to be rotated having the same exterior dimension may be placed and replaced in alignment and bearing supports 36 merely by removing a single support 82 from recess 96. By properly positioning supports 82, 84 and 86 on base 80, workpiece 88 is maintained aligned during the entire welding rotation operation to aid in providing uniform integral welds between objects which may be of relatively large mass.

Drive mechanism

Drive mechanism 30 comprises a motor 124, which may be internal combustion or electric, connected to rotate shafts 125 and 126 that are connected by belt 28 to drive input shaft 128. FIGURE 2 shows belt 28 extending between a pulley 135 on shaft 126 and a pulley 136 on shaft 128. Input shaft 128 includes telescopic section 130 intermediate universal joints 132 and 134. This section 130 preferably comprises a longitudinally splined region wherein the splined end of shaft section 130 is longitudinally slidable within the joint hub 131 to enable longitudinal extension of shaft 128 without interrupting power transmission when axial pressure is exerted on the work being welded. One end of input shaft 128 is supported adjacent pulley 136 in bearing assemblies 138 and 140. The other end of shaft 128 is supported adjacent the workpiece belt drive unit 34 by bearings 137 and 139.

Brake 32, which may be of the usual internally expanding type comprises conventional shoe and actuator mechanism mounted on a spider carried by support bracket 160 and coacting with a suitable drum on input shaft 128, and is automatically fluid actuated, preferably simultaneously with the disengagement of clutch 26, to stop rotation of the center workpiece at a predetermined time during welding, as will appear.

Shaft 128 also incorporates a speed sensing device 144, shown in detail in FIGURE 3, located longitudinally between brake 32 and belt drive mechanism 34. This mechanism incorporates a toothed wheel 146 rotating with shaft 128 in proximity to but not in contact with core 148 of sensor 150, which is an electro-magnetic transducer connected to the electrical control of the machine. There is a magnetic coupling between wheel 146 and core 148 modified by rotation of wheel 146.

Speed sensing device 144 positively signals complete stoppage of rotation of shaft 128 upon completion of the welding cycle, whereupon belt drive mechanism 34 automatically unlocks and opens to release the workpiece as to be hereinafter explained, this also assuring that the belt drive will not open until complete stoppage of the drive mechanism.

The workpiece rotating belt drive unit

The belt drive unit 34, shown diagrammatically in FIGURE 1 and in more detail in FIGURES 2, 6 and 19 to 22 is located at one end of input drive shaft 128 in alignment with and partly extending into the work area of the machine between alignment and bearing assemblies 36. It includes a frame 161 that carries endless belt 162 which in turn secures and rotates workpiece 88. Fixed on shaft 128 by means of key 129 (FIGURE 20) is a drive pulley 142. Shaft 128 is supported at opposite sides of pulley 142 by coaxial bearings 137 and 139. Bearing 139 is carried by a dual armed bracket 160 which also carries the speed sensing device 144 of FIGURE 3, and bearing 137 is carried by an adjusting mechanism (FIGURE 20) presently to be described. Drive pulley 142 is disposed in an open circular recess between bifurcated legs 170 and 172 of frame 161. The lower end of bracket 160 is angularly adjustably mounted on cross shaft 164 carried by an upright bracket 166 on frame 44 (FIGURE 6). Correct axial alignment and support of drive pulley 142 and main drive shaft 128 is maintained by means of abutment 168 on bracket 160 and adjustable stop 170 on frame 44 of the machine.

Support frame 161 is made up of identical spaced parallel frame members 176 and 178 (FIGURE 9) for accommodation of relatively wide belt 162 and carries idler pulleys 180 and 182 on appropriately journalled cross shafts 184 and 186, respectively. These idler pulleys extend between frame members 176 and 178 in close adjustable proximity with the peripheral surface of main drive pulley 142 to engage belt 162. The slack in belt 162 is controlled by a longitudinally adjustable idler pulley 188 shifted by a fluid driven dual piston unit 190 and 190a (FIGURES 6 and 19) mounted on a slide 169 on frame leg 170 and connected to the electro-fluid control system of the machine as will appear.

Frame 161, as shown in FIGURE 6, extends upwardly at a slight angle from frame 44 and includes a jaw structure 192 comprising movable jaw 194 and fixed jaw 196 which define a substantially circular recess therebetween. Movable jaw 194 is capable of being opened and closed by fluid cylinder 198 to lock or unlock workpiece 88 in position, and piston 198 is also connected to the electro-fluid control system of the machine. Belt guiding idler pulleys 200 and 202 are mounted on the jaw ends as shown in FIGURE 6. Cylinder 198 may be actuated to cause belt 162 to envelop workpiece 88 by relatively positioning pulleys 200 and 202 in close proximity thereto.

Cylinder 198 incorporates a double acting piston carrying a piston rod 204 pivotally connected at 203 to link 208 that is pivoted on movable jaw 194 at 207. A similar link 208 is pivoted in frame 161 at 205, and the two links are joined by a common pivot 209.

To open jaw 194, cylinder 198 is actuated to shift rod 204 downwardly in FIGURE 6 to displace the links into the phantom line condition of FIGURE 6, jaw 194 swinging clockwise about its frame pivot 210. The lower end of cylinder 198 is pivoted to the frame at 212 to permit the cylinder to swing during this action to prevent binding of the link pivots.

It will be observed that when the jaws 194 and 196 are in closed position, the links 206 and 208 extend toward each other in alignment so that the centers of pivots 205, 203, 207 and 209 lie in a common plane, with this condition firmly maintained by the extended piston rod 204. This insures stability of the closed jaw and belt action.

Suitable switches at the links 206 and 208 are provided to indicate the open and closed position of the jaw, as will be hereinafter described.

Also on the exterior of movable jaw 194 is mounted a flanged idler pulley 214 (also see FIGURE 7). Pulley 214 although spaced slightly from belt 162 prevents belt 162 from excessive chatter and vibration while maintaining it upon idler pulleys 180, 182, 188, 200 and 202.

Belt drive frame 161 permits accurate axial alignment of workpiece 88 with one or two other workpieces to be welded and is adjustably supported for desired angular position by a brace 216 pivoted at one end at 217 on bracket 166 and at its other end by means of a link 224 on frame 161. A hydraulic cylinder 226 is pivoted on the bracket 166 at 228 and its piston rod 220 is pivotally connected at 221 to brace 216.

Counterclockwise movement of frame 161 as viewed in FIGURE 6 is limited by contact between abutment 230 of brace 216 and adjustable stop 232 on bracket 166 to provide an additional safety measure in the case of hydraulic failure of cylinder 226. Furthermore, this stop arrangement may conveniently be used to support frame 161 when the machine is being serviced.

A relatively wide belt 162 is preferred for many operations to assure maximum support, to minimize radial vibration and to provide sufficient contact area to securely hold the workpiece to be rotated. The operation of belt drive support frame 161 and belt 162 will be subsequently described in more detail.

With reference to FIGURES 19 to 22, the adjustable means to create sufficient friction between the belt and at least some of the belt pulleys for effective rotation of workpiece 88 without slippage will now be described.

Work drive belt 162 is a flat smooth belt and the drive transmission therefore between the pulleys and belt is purely by friction. In order to effectively rotate a cylindrical workpiece enveloped by the belt 162 and which is subjected to a large axial force and further tends to resist rotation due to extremely high friction forces as in the present novel welding process, means is provided in the invention to adjustably increase or decrease and maintain determined effective drive friction between the pulleys and the belt to prevent slippage. As shown in FIGURES 6 and 19 belt 162 extends in a loop 163 partly around pulley 142.

As shown in FIGURE 19, drive shaft 128 is rotatably connected at the other side of drive pulley 142 opposite bracket 160 with two angularly related links 528 and 530 which are substantially identical and form a scissor-like structure, that is, they overlap each other at their common end connection to the drive shaft 128 but extend away from each other to be connected at their other ends to the respective shafts of the pulleys 180 and 182. Link 528 is attached to pulley 180 and link 530 is attached to pulley 182.

With further reference to FIGURE 20, the common connection of the links 528 and 530 at the drive shaft 128 is by a collar 532 which at the same time forms a bearing retainer for the bearing unit 137. Collar 532 contains dual antifriction bearings 534 and 536 rotatably supported on a sleeve 538 which is pressed onto drive shaft 128. Suitable spacers 540 space the bearings from each other and from the drive pulley 142. The outer end of sleeve 538 is closd by a flanged plug 542 which is provided with head screws 544 screwed into the end of shaft 128. Plug 542 axially retains the sleeve 538 and spacers 540 and by tightening or loosening the screws 544 the bearing preload may be adjusted. It will be understood that links 528 and 530 are pivotable around shaft 128.

The lower ends of links 528 and 530 are of enlarged cross section as at 546 and 548 respectively forming ridges 550 and 552 extending oppositely to each other so that the centers of the link ends attached to the pulleys 180 and 182 respectively lie in a common plane.

As shown in FIGURE 20, the enlarged end 548 of link 530 is provided with a bore 554 which receives an eccentric collar 556 having an outer flange 558 which bears against the outside of the link 530. The face of the collar flange 558 is provided with a hexagonal boss 560 by means of which the collar 556 may be rotated with the aid of a wrench. The collar 556 may be locked against rotation in bore 554 by means of a set screw 562 in the end of link 530 which extends into a radial groove 564 in the collar.

Collar 556 is provided with an axially offset through bore 566 which receives the outer end of pulley shaft 186 onto which the collar is normally locked against rotation by a set screw 568 in the flange 558 which extends into a radial groove 570.

The outer end of pulley shaft 186 extends through an enlarged aperture 572 in a section of frame member 176 of the support frame 161 and then extends through the pulley 182 towards the other frame member 178 to be supported therein. Pulley 182 is rotatably supported on shaft 186 by antifriction bearings 574 at both ends of the pulley and suitable seals 576 are provided to close the interior 578 of the pulley to protect the bearings against dirt and moisture.

At their overlapping intermediate portions, links 528 and 530 are secured to each other and against relative pivotal movement after proper adjustment by means of a screw 580 and washer 582. As seen in FIGURE 22 screw 580 is screwed into the inner link 528 and extends through an enlarged eccentric opening 584 by which pivotal movement of the links relative to each other is allowed.

From FIGURE 20 it will be seen that, after loosening screw 580 and set screws 562, and 568 the eccentric collar 556 may be rotated by the hexagonal boss 560 which causes advance or retraction of the pulley 182 in relation to the drive pulley 142, thus gripping the work drive belt 162 between them until the desired drive friction is reached. Movement of the pulley 182 necessitates and causes pivotal movement of the link 530 in relation to link 528 which is permitted by the eccentric opening 584 in link 530. It will be understood that link 528 and the associated pulley 180 are similarly provided with an identical eccentric adjustment for the same purpose of adjust the gripping pressure between pulley 180 and pulley 142. Upon proper drive friction adjustment at the pulleys 180 and 182, screw 580 is tightened to lock the links and set screws 562 and 568 are tightened to lock the eccentric collar 556 thus securely maintaining the adjusted position under drive conditions.

In addition to adjustable pulleys 180 and 182, a third eccentrically adjustable pulley 586 is provided opposite from pulleys 180, 182 to provide a desired three point frictional gripping contact of belt 162 around the drive pulley 142.

Pulley 586, which is shown in detail in FIGURE 21, is positioned in the frame 161 adjacent the slide cylinders 190, 190a between the two frame members 176, 178. Pulley 586 is rotatable about a shaft 588 on which the pulley is supported on antifriction bearings 590 and 592. Suitable seals 594 and 596 adjacent the bearings protect the interior 598 of the pulley against entrance of dirt and moisture.

The outer ends of the shaft 588 extend outwardly through the parallel frame members 176 and 178, and one end of the shaft is provided with a lubricant fitting 600 which is in communication with an axial conduit 602 extending through shaft 588 from which radial branches 604 may extend to the interior 598 of the pulley 586 to allow lubrication of the bearings 590 and 592. A similar lubrication arrangement is preferably provided at the remaining four idler pulleys.

The ends of shaft 588 extend into eccentric collars 606 and 608 fitted in coaxial apertures 610 and 612 in the frame members 176, 178. Collars 606 and 608 are identical and therefore it will suffice to describe only one.

Eccentric collar 606 is provided with an outer flange 614 which bears against the outside of frame member 178. Flange 614 is provided with a number of curved recessed slots 616 (FIGURES 6 and 19) whose center is the true center of the flange and through which extend head screws 618 which are screwed into the frame member 178. Arranged between the slots 616 are a number of indentions 620 for the insertion of a proper tool to rotate collar 606.

Upon loosening of head screws 618, eccentric collar 606 may be rotated which causes the pulley 586 to advance or recede to or from the drive pulley 142 until the proper friction gripping of the belt 162 on pulley 142 is reached. After adjustment the head screws 618 in the slots 616 are again tightened to lock the collar 606 against rotation.

By the arrangement as shown in FIGURES 19 to 22, the necessary driving friction between the pulleys and belt may be adjusted to suit a variety of workpieces to be rotated by belt 162. The three pulleys 180, 182 and 586 are all adjustable to vary their gripping action on the belt at loop 163, and this adjustment is not changed by rocking of belt drive unit 34 by cylinder 226.

End workpiece clamping members

For a three piece friction welding operation, the adjacent ends of workpiece 88, which is mounted in belt 162, and alignment and bearing support assemblies 36 (FIGURE 9) are located adjacent the corresponding ends of workpieces 120 and 122 held in left hand clamping unit 38 and right hand clamping unit 40 respectively. Clamping unit 38 is fixed against axial and rotational movement on frame 44, while clamping unit 40 is fixed against rotation on frame 44 but is axially movable thereon under applied force to evert axial pressure on the three workpieces to be welded. The positions of the two clamping units can be reversed if desired or required by plant conditions accompanied by appropriate modification of the other components of the friction welding machine. Except for the capacity of clamping units are substantially the same. Therefore detailed description of only clamping unit 40 will be given.

Clamping unit 40, FIGURES 11 and 12, is carried by frame track 66, mounting plate 70 thereof slidably supporting base plate 240. Welded to plate 240 are spaced butress members 242, 244 and 246 which in turn carry bolted casing members 248, 250 and 252. These casing members are contoured to receive an irregular object such as an I-beam shaped front axle outer end 122 which is large and non-symmetrical with a bottom bearing flange 254.

Clamping unit 40 as a whole is non-rotatably fixed to frame 44 by bolted L-brackets 256 and 258 but the casing members may be easily removed from the unit by removing bolts 260 and replaced by other casing members housing similarly or differently shaped workpieces without detaching the entire unit. Workpiece 122 may be any one of a variety of differently shaped objects. Bolts 261 (FIGURE 12) may similarly be removed to permit release and/or replacement of workpiece 122 without disturbing the remaining components of unit 40.

During welding the end surfaces of workpieces 88, 120 and 122 are pressure engaged by force applying member 42 through clamping unit 40 at bearing plate 264 by abutment 266 against abutment 268 of workpiece 122 so as to slide device 40 to the left as viewed in FIGURES 1 and 9. Unit 38 is essentially the same except that studs 259 (FIGURE 12) are tightened to lock the unit to track 66.

Axial force applying assembly

Force applying assembly 42, shown in detail in FIGURE 8, is automated and may be programmed to commence the welding cycle and axial push up to frictionally engage the objects to be welded, to end rotation of the one workpiece upon obtaining the required heat level and plastic state of the metal or metals, to simultaneously disengage clutch 26 and engage brake 32 to stop workpiece rotation, to apply fusing pressure if and as necessary upon cessation of such rotation, to apply cooling pressure thereafter and to appropriately release all pressure imposed following fusion of the workpieces.

Force applying assembly 42 includes double acting ram cylinder 280 (FIGURE 1), the piston rod 281 of which drives push rod 282 into engagement with bearing plate 264 to longitudinally move clamping unit 40. Cylinder 280 is controlled by suitable solenoid valves operated by electric controls later to be explained.

Panel 284 (FIGURE 8) aids in the programming of the machine and is situated to the side of cylinder 280 and carries electric limit switches 286, 288, 290 and 292 in circuit with the electrical controls of the machine. Between upper switches 286 and 292 and lower switches 288 and 290 are a pair of rods 294 and 296 connected to piston rod 281 by bracket 302 and slidable in panel attached supports 298 and 300. Rods 294 and 296 are fixed together by suitable clamps 304 and 306 so as to slide in unison responsive to the movement of piston rod 281. Lower rod 296 houses tension spring 308 attached to the rear of panel 284 by stud 310 to resist the movement of rods by a predetermined amount of tension.

Rods 294 and 296 each carrying two axially spaced abutments, 312, 314, 316 and 318 respectively, which are longitudinally adjustable on the rods so as to abut and trip their associated limit switches at predetermined times depending on the type of workpiece to be welded. A suitable scale 320 allows the abutments to be accurately positioned for programming a given welding operation.

In the present embodiment, in sequence, the advance of piston rod 281 to the left in FIGURE 8 to drive clamping unit 40 induces movement of rods 294 and 296 first causing abutment 314 to actuate switch 286 to initiate start of actual welding and axial push-up; further travel of piston rod 281 and rods 294 and 296 in the same direction engages abutment 316 to trip switch 288 for initiation of the welding heat cycle. Further advance of push rod 281 in the same direction causes abutment 312 to trip switch 292 to end the heating cycle and to release clutch 26 which in turn, through the electro-fluid control system, applies brake 32 to stop rotation of the workpiece 88. Additional forward travel continues while the push-up pressure applied to the workpieces is markedly increased for the purpose of forging the pieces together, thus assuring a strong weld. This causes abutment 318 to trip switch 238 to end the pressure push-up and trigger a solenoid valve to apply a reduced holding pressure to be maintained during cooling of the welded workpieces.

The electro-hydraulic air-control system

The friction welding machine of this invention is fully automated and capable of being programmed so as to carry out all operational steps without direct operator attention or manual manipulation. Programmable automation is accomplished by means of an inter-related electro-fluid control network. Hence, the sequential operation of the machine is controlled by a plurality of suitable electrically timed switching devices connected to solenoid-valves to actuate air and hydraulic mechanisms. The electrically timed sequential operation of the machine is also adjustable prior to any welding operation whereby the switches may be set to be triggered at selected time intervals depending on the size and material of the workpieces to be welded. Rotation speed, axial force, heating time, and fusing push-up force are parameters which influence the setting for a given welding cycle.

The machine control network, shown schematically in FIGURE 16 utilizes interrelated, electrical, hydraulic and air controls. The hydraulic system is supplied with fluid under pressure by line 330 connected to a temperature controlled hydraulic reservoir (not shown) and feeds pumps 1 and 2 directly through lines 332 and 334, respectively.

Pump No. 1 is connected by line 336 to central manifold distributor 338 which controls the main hydraulic circuit. Distributor 338 incorporates separate solenoid valves 340, 342, 344 and 346 which control the several outlets. Outlet lines 348 and 350 are connected to a hydraulic cylinder 352 fore and aft of piston 354. Hydraulic cylinder 352 is controlled by piston 356 of air pressure cylinder 358 by means of interconnecting piston rod 360. In this way the pressure in the main hydraulic system may be modified to in fact provide an accumulator for the axial force applying cylinder 280 to be used during push-up (FIGURES 1 and 16).

Distributor 338 is also connected to the pressure and exhaust sides of piston 362 of ram cylinder 280 by lines 364 and 366 respectively. The working pressure supplied through line 364 and the piston return pressure supplied through line 366 is controlled by solenoid-valve 346. Solenoid-valves 340 and 346 are electrically connected by conduits 368 and 370, respectively, to collector panel 372 which leads into push button control console 46 (FIGURES 1 and 16). Solenoid-valve 342, electrically connected to collector panel 372 by conduit 374, controls the fusing or forging pressure built up in cylinder 280 following cessation of heat generating rotation, as explained earlier, by permitting hydraulic accumulator cylinder 352 to surge fluid under high pressure through distributor 338 into line 64. Solenoid-valve 344, electrically connected to panel 372 by conduit 376, is a relief valve which is energized to close on forward movement of cylinder 280.

Accumulator signal switches 378 and 380, connected to panel 372, signal at control console 46 the return and inactive positions, respectively, of the air-hydraulic accumulator 352 and 358 when tripped by abutment 382 on rod 360.

Solenoid-valve 383, electrically energized through conduit 384 is fluid fed by pump No. 2 through the line 386 to open and close movable jaw 194 of belt drive unit 34 as previously explained. Lines 388 and 390, from solenoid-valve 383, feed the pressure and exhaust sides from piston 392 of cylinder 198 for this purpose.

Limit switches 396 and 398 are adapted to be opened or closed by the link mechanism 206 and 208 of movable jaw 194 and thereby trigger brake 32 and solenoid 342, respectively, as will be explained in detail in the description of the operation of the machine. Conduits 400 and 402 electrically connect limit switches 396 and 398, respectively, with a second electro-panel 404, which likewise leads into electrical control console 46.

The high pressure force required for fusing or forging push-up of the members being welded is generated at cylinder 358, the input side of which is connected by line 406 to a number of individual air pressure tanks 408, 410, 412 and 414 of varying storage and pressure capacity. These tanks may be selectively connected to the compressed air control system according to the pressure requirements for a certain work demand. Pressure gauges 416 may be attached to the tanks to visibly indicate their respective pressures. Line 406 is also connected to solenoid-valve 418, which in turn is electrically energized from panel 372 by conduit 420, and through line 422, air feeds storage tank 424 which in turn is connected to lever valve 426 for optional manual manipulation. Two lines 428 and 430 connect lever valve 426 with cylinder 190 of adjustable belt tension idler pulley 188. Cylinder 190 may be either manually actuated by lever valve 426 or automatically actuated upon energizing of solenoid-valve 418.

Belt drive frame support and alignment cylinder 226 is supplied with air under pressure by lines 432 and 434 from lever valve 436 to permit manual actuation of cylinder 226. Air received by valve 436 passes from compressed air supply line 438 through line 440, pressure regulator 442 and line 444.

Line 440 also provides air under pressure to pressure regulator 446, which through line 448, supplies storage tank 450 of the brake actuating control mechanism of brake 32. Solenoid-valve 452, when energized through electrical conduit 454 from panel 404, transmits air under pressure received from storage tank 450 through line 456 to diaphragm 458 whose push rod 460 drives piston 462 of hydraulic cylinder 464 to the right as viewed in FIGURE 16. This results in the fluid in line 466 forcing shoe 468 into compression engagement with the drum of brake 32 which is located on the main drive shaft 128. Shoe 468 is normally compressed against brake 32 when the machine is inactive. Pressure switch 470 electrically attached to panel 404 by conduit 472 is triggered when cylinder 462 is actuated following a period of inactivity, for purposes later to be explained.

Adjacent brake 32 is speed sensor mechanism 144 which operates to hold belt 162 in the locked position during rotation thereof (see FIGURE 3) and the corresponding description, sensor 150 of which is connected by conduit 474 to collector panel 404.

Line 440 also supplied air to a third gauge equipped pressure regulator 476, line 478 and storage tank 480 of the clutch control mechanism of clutch 26. Solenoid-valve 482, serviced with air tank 480 through line 484, in turn supplies air through line 486, cross connection 488 and line 490 to operate diapragm 492. Push rod 494 moves in a linear-direction responsive to movement of diaphragm 492 pivoting actuating lever 496 to selectively apply or release clutch 26 when solenoid-valve 482 is energized from control console 46 and panel 372 through conduit 498 and distribution box 500. The two other branches of cross connection 488 connect pressure switches 502 and 504, respectively, whose electrical conduits 506 and 508 also connect through distribution box 500 and conduit 498 to panel 372.

Switches 502 and 504 are responsive to air pressure in the clutch actuating mechanism during release and application of cultch 26, for purposes later to be described.

As described earlier, the presure build up, duration, magnitude and release of the axial force supplied through push rod 282 by cylinder 280 of force applying assembly 42 is program-controlled by setting of abutments 312, 314, 316 and 318 and the response thereto of suitable limit switches 286, 288, 290 and 292 (FIGURE 8). These switches also signal the initiation and end of the welding cycle and the simultaneous disengagement of clutch 26 and engagement of brake 32.. Electrical conduits 510, 512, 514 and 516 connect limit switches 286, 288, 290 and 292, respectively, to collector panel 404 for electrical contact with control console 46.

Control console 46 is equipped with the following instruments, proceeding from top to botom beginning in the upper left hand corner as viewed in FIGURE 16:

| Abbreviation: | Function |
| --- | --- |
| P1 | Signals that pump 1 is on and functioning properly. |
| P2 | Signals that pump 2 is on and functioning properly. |
| Power (off and on) | Master switch. |
| Mot | Signals that motor 124 is on and functioning properly. |
| ON | Start button for motor 124. |
| OFF | Stop button for motor 124. |
| EME | Signals emergency stop. |
| RES | Emergency reset button. |
| PANIC | Master stop button. |
| HYD | Signals that the hydraulic power system is functioning properly. |
| ON | Start buttom for the hydraulic system. |
| OFF | Stop button for the hydraulic system. |
| RET | Signals return. |
| START | Welding cycle start button. |
| REV | Assures that pressure cylinder 280 is in the returned position. |
| HEAT | Signals heat. |
| JOG REV | Reverse jog button. |
| PILOT | Pilot light. |
| TEST | Manual rotatable switch to test the circuits prior to starting the machine. |
| JOG FWD | Forward jog button. |

Prewelding, loading and welding operations

A great variety of separate, hollow or solid, two or three workpieces may be welded into an integral structure by the method and machine of this invention, contingent upon their having appropriate welding surfaces (circular planar matching surfaces being preferred) sufficient take up metal for displacement adjacent those surfaces to allow displacement during the fusing or forging step, and one workpiece being rotatable about its longitudinal axis. For illustrative purposes a description of the prewelding, loading and welding stops required for an integral union of the three piece vehicle front axle sections of FIGURE 9 will be given.

When the machine is idle and power is off, supply air pressure, which is present at all times, engages brake 32 to hold shaft 128 against rotation and maintains clutch 26 in its disengaged position of FIGURE 16. Preparatory to operation, preliminary adjustments of the control network to suit the members to be welded are made, including selective positioning of abutments 312, 314, 316 and 318. All circuits are tested by rotatable switch "TEST" and the "POWER" switch, the "ON" push button of the pump motors for pumps 1 and 2, and the "ON" button of motor 124 are actuated on control console 46. Brake 32 and clutch 26 during this testing remain in the engaged and disengaged positions respectively by means of suitable relays (not shown). The emergency reset button "RES," the hydraulic "ON" button and the reverse "REV" button are each actuated to cause movable jaw 192 to move from its idle closed position to its open position, to provide hydraulic power, and to assure that cylinder 280 is in the return position, respectively.

As earlier explained, irregular non-symmetrical steering axle end pieces 120 and 122 are circular in cross-section at the surfaces to be welded, solidly I in cross-section at certain points and include spring mounting plate 254 and steering knuckle bosses 262. This complex structure is enclosed in casing members 248, 250 and 252 (FIGURE 12) of clamping units 38 and 40, respectively. The central section of this axle is a seamless tubular element 88 of uniform cylindrical shape from end to end. Workpiece supports 82, 84 and 86 at each side of belt 162 are radially adjusted to conform exactly to the diameter of tube 88.

Workpiece supports 82 of both the right hand and left hand alignment and bearing asemblies 36 are withdrawn from recess 96. This opens up opening 96 enabling workpiece 88 to be inserted so as to be cradled in the outwardly open loop 161 (FIGURE 6) of belt 162 and seat upon rollers 97 of right and left hand supports 84 and 86 (FIGURE 4). Supports 82 are then repositioned in recesses 96 so that all six rollers 97 similarly frictionally rotatably abut workpiece 88.

It will be observed here that the entire tubular workpiece 88 which is the heavy massive front axle center section is axially slidably supported by the axially spaced roller sets for rotation about its longitudinal axis, and a considerable area of tubular workpiece laying between the coacting pairs of three circumferentially distributed rollers 97 is axially slidably enwrapped in loop 161 of the endless belt 162. The belt is not relied upon to carry the weight of workpiece 88, and its entire energy is imparted to rotate tube 88 during the welding operation.

The end sections 120 and 122 of the front axle here being welded are forged integral sections which have cylindrical tubular inner ends at 322 and 324 in FIGURE 9 that are of the same shape and diameter as the corresponding ends of tube 88 (see FIGURES 13 and 14).

Movable jaw 194 is now closed by pressing the "START" button of control console 46, de-energizing solenoid-value 383 for permitting hydraulic fluid under pressure to advance the piston of cylinder 198. The closing movable jaw 194 also closes limit switch 398 and opens limit switch 396, which opening causes, by means of suitable relays (not shown), energization of brake solenoid-valve 452 to release brake 32 and engage clutch 26. Release of brake 32 opens switch 470 at cylinder 464, causing energization of clutch solenoid-valve 482 to engage clutch 26 whereby belt 28 rotates shaft 128 and starts movement belt 162 to rotate workpiece 88 about its axis.

Air pressure acting on diaphragm 492 to engage cltuch 26 also causes switch 504 to open and switch 502 to close, which closing energizes the solenoid-valve 340, at distributor 338, by means of a number of suitable relays (not shown). This applies hydraulic pressure to cylinder 280 to displace push rod 282 to the left in FIGURE 1 and as indicated by arrow 520 in FIGURE 16. This causes abutment 314 to trip limit switch 286 initiating the welding cycle in axial push up, which brings the adjacent end surfaces of workpieces 88, 120 and 122 nearly in contact with each other in the position shown in FIGURE 9 at 332 and 324. Drain or relief solenoid-valve 344 is in electrical parallel with solenoid-valve 340 and upon forward travel of push rod 282 will be closed. It will be observed that the axially slidable mounting of workpiece 88 permits any axial displacement of workpiece 88 necessary during the operation.

Further travel of push rod 282 causes abutment 316 to trip limit switch 288 energizing solenoid-valve 342 permitting a gradual hydraulic pressure build up in cylinder 280 to initiate axial welding by bringing the adjacent end surfaces of the three workpieces gradually into high axial pressure frictional heat generating contact. This action continues for a sufficient period until the frictionally engaged workpiece ends have been heated to the melting point whereby continued application of push rod pressure caused axial and radial displacement of the now plastic metal at the frictionally engaged rubbing surfaces.

Further advance of rod 282 ensues upon this displacement of metal and this triggers, by abutment 312, limit switch 292 for disengaging clutch solenoid-valve 482 to release clutch 26 and thereby stop transmission of power to shaft 128. Return air pressure caused by the release of clutch 26 closes switch 504, thereby de-energizing brake solenoid-valve 452 so that air pressure now applies brake 32 to positively arrest rotation of drive shaft 128.

Upon stoppage of shaft 128, speed sensor device 144 acts, through relays (not shown), to energize solenoid-valve 383 whereby cylinder 198 is return actuated opening movable jaw 194 to release workpiece 88 from the belt loop. Opening of movable jaw 194 closes limit switch 396 and opens limit switch 398, which opening energizes solenoid-valve 342 of manifold distributor 338, permitting high pressure from accumulator 352–358 to enter cylinder 280 to now urge push rod 282 to the left in FIGURE 1 with increased pressure to pressure-forge the three workpieces together at their abutting, now plastic and deformable adjacent end regions to aid in insuring structurally sound weld joints.

This increased pressure on push rod 282 results in continued forward travel of rod 282 and soon triggers, by means of abutment 218, limit switch 290 signalling the end of the push-up step and actuating the control circuit for reducing the pressure level in cylinder 280 to that required for cooling in place.

After cooling, the integral axle product is removed from the machine, and push rod 282 is returned to its initial unloaded position by depressing the "REV" button on control console 46 which activates solenoid-valve 346 on manifold distributor 338 to apply return pressure to cylinder 280. At the same time solenoid-valve 340 is de-energized and drain solenoid-valve 344 is opened to allow fluid exhaust from the rear chamber of cylinder 280 back into the supply. The fuel return position of cylinder 280 is signalled by the "RET" light on the control console 46. Thus, a full work cycle is automatically completed which may be repeated for similar or other dissimilar workpieces to be inserted into the jaws.

The resultant front axle product has welded joints firmly fused together which have substantially the same metal grain structure as the parent metal. Along both the outer and inner surfaces of the product at weld joint diagrammatically shown at 522 (FIGURE 14) usually appear a pair of collars or annular ridges 524 and 526 separated by a groove and represent plastic displacement of the parent metal caused during axial push-up. Such metal displacement is of predetermined degree in the operation so as to produce a finished article of known length. Ridges 524 and 526 may be easily turned or ground off to provide a smooth surface if desired. The pieces are so firmly bonded together that when the ridges are ground off the weld joint will not be recognized other than by the grind marks.

Test results of one example of the above described sequential welding operation are shown in the charts of FIGURE 17 which illustrate the short welding time required, less than 60 seconds, the low power consumption, and the longitudinal dimension reducing metal displacement. The axial "rubbing-in" force gradually rose to approximately 12,000 pounds, remaining constant at that value during the heating period. At the end of the heating period workpiece rotation stopped and the force was abruptly increased to approximately 54,000 pounds for the short push-up period. Thereafter, the force was again reduced to approximately 12,000 pounds during cooling to maintain control of the effective length of displacement before reducing the force to zero.

The metal displacement chart shows a final displacement of about 0.80 inch and the power consumption chart shows a consumption of approximately 38,000 watts at the start of operation when the surfaces to be welded first frictionally contact each other. Once the initial resistance was overcome, power consumption dropped to 4,000 watts and thereafter increased at somewhat irregular intervals with increased axial pressure to about 24,000 watts shortly before commencement of the heating period. During the heating stage frictional resistance was reduced and therefore power consumption decreased steadily to about 16,000 watts. The actual combined rubbing-in and heating period lasted only about 38 seconds for this particular set of workpieces. While these values may change, there remains a favorable ratio of power and time consumption.

Another example of a second desirable sequential welding operation distinct from the operation of FIGURE 17 is shown in the charts of FIGURE 18. This welding operation, arrived at as a result of prolonged tests, is distinguishable from the operation described by FIGURE 17 in that the initial rubbing-in force is rapidly increased to approximately 6,000 pounds, thereafter is gradually magnified to 15,600 pounds at the heating stage, and finally is abruptly increased during push-up forging to approximately 62,000 pounds without further reduction prior to shut off, resulting in an appreciably shorter welding time without adverse effect on the quality of the weld. However, the precise sequential welding steps may vary somewhat depending on the size and type of material of the workpieces to be welded.

This machine may also be used to friction weld one stationary workpiece to a second rotating workpiece, as for example symmetrical spindles and their associated axle housing. In that case it may be preferable to hold the axle housing stationary and rotate the spindle thereagainst. This can be accomplished by the same belt drive assembly 34 by providing an adaptor into which the spindle may be chucked and rotated in a manner similar as that described in conjunction with workpiece 88.

Thus a novel method and machine to friction weld relatively large articles has been provided. The machine is belt driven, automatically controlled and adaptable to a wide variety of workpieces of different shapes and sizes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method of friction welding metal workpieces in which said workpieces are rotated at a constant speed relative to each other, are engaged under axial pressure, and are rubbed together until the metal has become plastic in the area of contact and thereafter stopping relative rotation between said workpieces, the improvement in which said workpieces:

(a) upon initial engagement are rotated under a first rapidly increasing pressure rate for a relatively short period of time; then (b) under an increasing pressure, at a second and slower rate, for a relatively longer period of time until a predetermined pressure level is reached; and thereafter (c) substantially further increasing engagement pressure after the metal has become plastic in the area of contact to a final forging pressure to complete the weld; and (d) maintaining said final forging pressure for a predetermined interval after relative rotation between said workpieces has stopped.

2. The method according to claim 1 in which said first rapidly increasing pressure rate is such that the pressure at the end of the first second is about 3,000 p.s.i.

3. The method according to claim 1 in which said final forging pressure is at least twice the said predetermined pressure level and is applied for at least five seconds after relative rotation has stopped.

4. In a method of friction welding metal workpieces in which said workpieces are rotated at a constant speed relative to each other, are engaged under axial pressure, and are rubbed together until the metal has become plastic in the area of contact and thereafter stopping relative rotation between said workpieces, the improvement in which said workpieces:

(a) upon initial engagement are rotated under a rapidly increasing pressure rate such that the pressure applied at the end of the first second is 3,000 p.s.i.; then (b) under an increasing pressure, at a second and slower rate, until a predetermined pressure level is reached; and thereafter (c) substantially further increasing engagement pressure after the metal has become plastic in the area of contact to a final forging pressure which is at least twice the said predetermined pressure level for at least five seconds to complete the weld.

5. A method of welding which comprises rotating a central workpiece between two outer workpieces in frictional engagement therewith by means of pressure applied axially at an initial relatively rapid effective rate of pressure rise and a subsequent relatively gradual effective rate of pressure rise until sufficient heat develops at the engaged surfaces to render them plastic, rapidly stopping rotation and urging the workpieces together while cooling said engaged surfaces.

6. A method of welding comprising contacting two outer workpieces and a central workpiece, relatively rotating said three workpieces under externally applied pressure so that the contacting surfaces are in frictional sliding engagement and continuing rotation at an initial relatively rapid effective rate of pressure rise and a subsequent relatively gradual effective rate of pressure rise until the engaged surfaces become plastic, stopping rotation, forcing the workpieces together and cooling the contacting zones.

7. In a method of friction welding metal workpieces in which said workpieces are rotated at a constant speed relative to each other, are engaged under axial pressure, and are rubbed together until the metal has become plastic in the area of contact and thereafter stopping relative rotation between said workpieces, the embodiment in which said workpieces:

(a) following initial contact are rotated under generally increasing pressure for a predetermined period of time until a predetermined pressure level is reached, including a relatively rapid effective rate of pressure rise during an initial portion of said predetermined period of time and a subsequent relatively gradual effective rate of pressure rise during a final portion of said predetermined period of time, said final time portion being several times longer than said initial time portion; then (b) substantially further increasing the engagement pressure after the metal has become plastic in the area of contact to a final forging pressure; and (c) maintaining said final forging pressure for a predetermined interval after relative rotation between said workpieces has stopped.

8. A method according to claim 7 in which said final forging pressure is approximately twice the predetermined pressure level and is applied for at least five seconds after relative rotation has stopped.

References Cited

UNITED STATES PATENTS

| | | | |
|---|---|---|---|
| 1,723,356 | 8/1929 | Knowles | 82—28 |
| 1,786,442 | 12/1930 | Miller | 82—28 |
| 1,806,344 | 4/1921 | Goad | 82—28 |
| 2,738,082 | 3/1956 | Vernon | 214—340 |
| 3,006,068 | 10/1961 | Anderson et al. | 29—497.5 |
| 3,037,409 | 6/1962 | Hare et al. | 82—45 |
| 3,134,278 | 4/1964 | Hollander et al. | 228—2 |
| 3,162,068 | 12/1964 | Hardy | 228—2 |
| 3,183,012 | 5/1965 | Watson | 82—45 |
| 3,185,368 | 5/1965 | Holloway et al. | 228—2 |
| 3,388,849 | 6/1968 | Blum | 228—2 |
| 3,314,583 | 4/1967 | Roberts | 228—2 |

FOREIGN PATENTS 632,036  6/1936  Germany.

OTHER REFERENCES

Vill, Friction Welding of Metals, American Welding Society, February 1962, pp. 2 and 3.

RICHARD H. EANES, JR., Primary Examiner